United States Patent [19]

Tokuda

[11] Patent Number: 5,352,759
[45] Date of Patent: Oct. 4, 1994

[54] LENS COMPRISING A POLYCARBONATE FORMED BY AN INTERFACIAL POLYCONDENSATION REACTION

[75] Inventor: Toshimasa Tokuda, Iyo, Japan

[73] Assignee: Teijin Chemicals, Ltd., Tokyo, Japan

[21] Appl. No.: 13,660

[22] Filed: Feb. 4, 1993

Related U.S. Application Data

[62] Division of Ser. No. 830,842, Feb. 4, 1992, abandoned.

[30] Foreign Application Priority Data

Feb. 5, 1991 [JP] Japan ................................. 3-035314

[51] Int. Cl.⁵ .............................................. C08G 64/00
[52] U.S. Cl. ..................................... 528/198; 528/196
[58] Field of Search ............................... 528/198, 196

[56] References Cited

U.S. PATENT DOCUMENTS

| | | | |
|---|---|---|---|
| 4,020,045 | 4/1977 | Baggett | 260/47 |
| 4,108,827 | 8/1978 | LaLiberte | 260/42.21 |
| 4,139,694 | 2/1979 | LaLiberte | 528/280 |
| 4,495,345 | 1/1985 | Kawakami et al. | 528/196 |
| 4,880,896 | 11/1989 | Otsubo et al. | 528/196 |

FOREIGN PATENT DOCUMENTS 0177713 4/1986 European Pat. Off.
0293769 12/1988 European Pat. Off.

OTHER PUBLICATIONS

Handbook of Chemistry, Lange, Eighth Edition, 1952, p. 266.
Hack's Chemical Dictionary, Fourth Ed., McGraw-Hill, New York, Jun. 1969, p. 515.
The Merck Index, Eleventh Edition, Merck and Co., Inc., Jun. 1989, p. 1167.

*Primary Examiner*—John Kight, III
*Assistant Examiner*—Terressa Mosley
*Attorney, Agent, or Firm*—Sherman and Shalloway

[57] ABSTRACT

There is provided a polycarbonate lens having improved transmittance of light with a wavelength of 400 nm. This lens is made of a polycarbonate derived from 1,1-bis(4-hydroxyphenyl)-1-phenylethane, specific viscosity found from a solution of 0.7 g of said polycarbonate in 100 ml of methylene chloride being 0.176 to 0.295, and transmittance of light with a wavelength of 400 nm passing through a 3 mm thick member molded from said polycarbonate being 80% or more.

2 Claims, No Drawings

LENS COMPRISING A POLYCARBONATE FORMED BY AN INTERFACIAL POLYCONDENSATION REACTION

This application is a division of application Ser. No. 07/830,842, filed Feb. 4, 1992, now abandoned.

This invention relates to a lens. More specifically, this invention relates to a lens made of a polycarbonate derived from 1,1-bis(4-hydroxyphenyl)-1-phenylethane and having improved transmittance of light with a wavelength of 400 nm, said lens being useful for optical instruments such as a camera, VTR, a copier, a telescope, and a microscope, for spectacles and for an automobile head lamp.

Heretofore, a polycarbonate obtained by reacting 1,1-bis(4-hydroxyphenyl)-1-phenylethane with a carbonate precursor has been known. A molded article having reduced viscosity of 0.40 to 0.90 has been also known (Japanese Laid-open Patent Application (Kokai) No. 8317/1985). Such polycarbonate is, however, tinted with yellow and not suited as a lens at all.

A silver salt film has a peak of sensitivity in light having a wavelength of 400 nm. A yellow-tinted lens decreases transmittance of light having a wavelength of about 400 nm. Accordingly, when the yellow-tinted lens is used in a camera, film sensitivity is decreased and color balance is lost. Under the circumstances, transmittance of light with a wavelength of 400 nm has to be 80% or more as a lens for camera. The conventional polycarbonate derived from 1,1-bis(4-hydroxyphenyl)-1-phenylethane is low in transmittance of light with a wavelength of 400 nm, and said transmittance is as low as up to about 75%. Said polycarbonate is thus impracticable as a lens.

It is an object of this invention to provide a lens made of a polycarbonate derived from 1,1-bis(4-hydroxyphenyl)-1-phenylethane and having improved transmittance of light having a wavelength of 400 nm.

The present inventors have made assiduous investigations on a process for producing a polycarbonate from 1,1-bis(4-hydroxyphenyl)-1-phenylethane, and have, as a result, succeeded in greatly improving transmittance of light having a wavelength of 400 nm, making it possible to achieve the above object of this invention.

According to this invention, there is thus provided a lens made of a polycarbonate derived from 1,1-bis(4-hydroxyphenyl)-1-phenylethane, specific viscosity found from a solution of 0.7 g of said polycarbonate in 100 ml of methylene chloride being 0.176 to 0.295, and transmittance of light with a wavelength of 400 nm passing through a 3 mm thick member molded from said polycarbonate being 80% or more.

The aromatic polycarbonate used to produce the lens of this invention is obtained by an interfacial polycondensation reaction of 1,1-bis(4-hydroxyphenyl)-1-phenylethane having high purity of 99.90% or more and phosgene, said phenylethane being a compound from which impurities formed in synthesizing 1,1-bis(4-hydroxyphenyl)-1-phenylethane, such as 1-(2-hydroxyphenyl)-1-(4-hydroxyphenyl)-1-phenylethane and trisphenol by-products are removed as much as possible. The interfacial polycondensation reaction is performed in a previously degassed solvent and a previously degassed aqueous alkali solution in a usual manner after adding an ordinary antioxidant such as hydrosulfite and especially phosphorous acid and/or a phosphorous acid ester to an aqueous alkaline solution of 1,1-bis(4-hydroxyphenyl)-1-phenylethane and blowing phosgene in an atmosphere of a nitrogen gas.

The ester of phosphorous acid ester here referred to is an alkyl ester having 1 to 20 carbon atoms, an aryl ester having 6 to 10 carbon atoms, or their partial esters. The aryl ester may be substituted with an alkyl group having 1 to 20 carbon atoms. Examples of the phosphorous acid ester are mono-, di- or tri-methylphosphite, mono-, di- or tri-ethyl phosphite, mono-, di- or tri-phenyl phosphite, mono-, di- or tri-cresyl phosphite, nonylphenyl phosphite, bis or tris(4-nonylphenyl) phosphite, (2,4-dinonylphenyl) phosphite, tris(2,4-dinonylphenyl) phosphite, and their mixtures.

Phosphorous acid and/or the phosphorous acid ester is added before blowing phosgene. With the addition after blowing phosgene or after polymerization, a sufficient coloration preventing effect can hardly be provided. The amount of phosphorous acid and/or the phosphorous acid ester is 0.01 to 0.5% by weight based on the weight of a dihydric phenol used. When the amount is less than 0.01% by weight, a sufficient coloration preventing effect can hardly be provided. When the amount is more than 0.5% by weight, the coloration preventing effect is saturated; when the amount is too large, the polymer is degraded.

Specific viscosity of the polycarbonate in this invention which is measured at 20° C. in 0.7 g/100 ml of a methylene chloride solution is 0.176 to 0.295, preferably 0.200 to 0.250. When specific viscosity is less than 0.176, the polycarbonate is brittle. When it is more than 0.295, fluidity is poor. Therefore, when the polycarbonate is molded into a lens, moldability is poor, and an optically good lens cannot be obtained.

The lens having good light transmittance in this invention is obtained by molding such as injection molding, compression molding or cast molding. Injection molding is the simplest method. The injection molding temperature is preferably 250° to 350° C.

The polycarbonate used in this invention can contain, as required, a stabilizer, a weathering agent, an antistatic agent, a mold release agent, a dyestuff, etc. in amounts that do not impair transparency.

The following Example and Comparative Examples illustrate this invention more specifically. Parts and % in said Examples are all by weight.

EXAMPLE 1

A 48.5% NaOH aqueous solution (2.624 parts) was dissolved in 22,800 parts of water and degassed through a nitrogen gas. Then, 3,417.5 parts of 1,1-bis(4-hydroxyphenyl)-1-phenylethane having purity of 99.90% was then dissolved in the solution, and 6.8 parts of hydrosulfite and 3.4 parts of triphenyl phosphite were added. Phosgene (1,400 parts) was blown in the presence of 16,000 parts of degassed methylene chloride at a temperature of 19° to 21° C. over a period of about 1 hour. After blowing of phosgene was finished, the internal temperature was raised to 28° to 33° C., and 123.8 parts of p-tert-butyl phenol and 194.4 parts of a 48.5% NaOH aqueous solution were added, stirred and emulsified. Then, 8.2 parts of triethylamine were added, and stirring continued for about 1 hour to complete the reaction.

An organic phase was separated from the reaction mixture, diluted with methylene chloride, washed with water, neutralized with hydrochloric acid, and further washed well with water. The organic phase was then separated. While methylene chloride was evaporated from the organic phase, the residue was pulverized to obtain a powder. Specific viscosity of a solution of 0.7 g of the powder in 100 ml of methylene chloride was 0.221.

To the powder were added 0.05% of Irganox 1076 (a trademark for a product of Ciba Geigy) and 0.2% of stearic acid monoglyceride, and the mixture was extruded into pellets at 250° to 260° C. The pellets were injection molded into discs 40 mm in diameter and 3 mm in thickness. Transmittance of light with a wavelength of 400 nm of the discs was 83.3%.

COMPARATIVE EXAMPLE 1

A powder was obtained as in Example 1 except that triphenyl phosphite was not used. Using the powder, discs were formed as in Example 1 and evaluated. As a result, transmittance of light with a wavelength of 400 nm was 70.5%.

COMPARATIVE EXAMPLE 2

A powder was obtained as in Example 1 except that the amount of p-tert-butylphenol was changed into 176.7 parts. Specific viscosity of the powder was 0.174. Using the powder, discs were formed as in Example 1. They were brittle and easy to break. No satisfactory discs were obtained.

COMARATIVE EXAMPLE 3

A powder was obtained as in Example 1 except that the amount of p-tert-butylphenol was changed into 79.5 parts. Specific viscosity of the powder was 0.296. Using the powder, discs were formed as in Example 1. Then, flow mark occurred in the discs. Accordingly, the powder was judged to be impracticable as a lens.

Since the lens of this invention has, as shown in Example 1, transmittance of light with a wavelength of 400 nm being as high as 80° C. or more, it can be used for optical instruments such as a camera, VTR, a copier, etc. and suitably utilized in lenses of spectacles, an automobile head lamp lens, etc.

What we claim is:

1. A lens comprising a polycarbonate formed by an interfacial polycondensation reaction of 1,1-bis(4-hydroxyphenyl)-1-phenylethane having a purity of at least 99.9% and a coloration preventing effective amount of at least one phosphorous acid ester selected from the group consisting of triphenyl phosphite and tris(4-nonylphenyl)phosphite, wherein said coloration preventing effective amount of the phosphorous acid ester is incorporated into said polycarbonate by being present during the interfacial polycondensation reaction, said polycarbonate having a specific viscosity measured in a solution of 0.7 g of said polycarbonate in 100 ml of methylene chloride at 20° C. of 0.200 to 0.250, and wherein the transmittance of light having a wavelength of 400 nm passing through 3 mm thick member molded from said polycarbonate is 80% or more.

2. The lens according to claim 1, wherein the coloration preventing effective amount is in the range of from 0.01 to 0.5% by weight based on the weight of 1,1-bis(4-hydroxyphenyl)-1-phenylethane used in the polycondensation reaction.

* * * * *